(12) United States Patent
Zhou et al.

(10) Patent No.: US 12,416,538 B2
(45) Date of Patent: Sep. 16, 2025

(54) SYSTEM AND METHOD FOR TESTING A SPECIMEN

(71) Applicant: ROLLS-ROYCE plc, London (GB)

(72) Inventors: Zhen Zhou, Derby (GB); Duncan A. Macdougall, Derby (GB); Julian M. Reed, Derby (GB)

(73) Assignee: Rolls-Royce PLC, London (GB)

( * ) Notice: Subject to any disclaimer, the term of this patent is extended or adjusted under 35 U.S.C. 154(b) by 393 days.

(21) Appl. No.: 18/183,999

(22) Filed: Mar. 15, 2023

(65) Prior Publication Data

US 2023/0314249 A1     Oct. 5, 2023

(30) Foreign Application Priority Data

Mar. 31, 2022 (GB) .................................... 2204670

(51) Int. Cl.
  *G01L 5/1627*  (2020.01)
  *G01L 1/22*    (2006.01)
(52) U.S. Cl.
  CPC .......... *G01L 5/1627* (2020.01); *G01L 1/2218* (2013.01); *G01L 1/2287* (2013.01)
(58) Field of Classification Search
  CPC ... G01L 5/1627; G01L 1/2218; G01L 1/2287; G01L 5/14; G01M 5/0016; G01M 7/08
  See application file for complete search history.

(56) References Cited

U.S. PATENT DOCUMENTS

| 5,325,701 | A | | 7/1994 | Zilliacus | |
|---|---|---|---|---|---|
| 6,116,077 | A | * | 9/2000 | Albertini | G01N 3/30 73/12.05 |
| 7,360,393 | B1 | * | 4/2008 | Abke | G01M 7/08 73/12.14 |
| 7,845,207 | B2 | * | 12/2010 | Read | G01N 3/313 73/12.11 |

(Continued)

FOREIGN PATENT DOCUMENTS

| CN | 111551458 A | 8/2020 |
|---|---|---|
| EP | 0859950 A1 | 5/1997 |

(Continued)

OTHER PUBLICATIONS

Mou, H., Xie, J., Pei, H., Feng, Z., Geng, H.URL: doi.org/10.1016/J.AST.2020.106344XP86377453A, Ballistic impact tests and stacked shell simulation analysis of aramid fabric containment system, Aerospace Science and Technology 107 (2020) 106344, Nov. 11, 2020.

(Continued)

*Primary Examiner* — Freddie Kirkland, III

(57) ABSTRACT

A system and a method of testing a specimen. The system includes an endcap, a plurality of bars, a plurality of strain gauges, and a gas gun. The endcap includes a first surface and a second surface opposite to the first surface. The first surface is curved. Each bar is disposed in contact with the second surface of the endcap and extends along a longitudinal axis. Each strain gauge is disposed on a surface of a corresponding bar from the plurality of bars. At least one (Continued)

strain gauge is disposed on the surface of each bar. The gas gun is configured to fire a specimen towards the first surface of the endcap such that the specimen impacts the first surface at an oblique angle relative to the longitudinal axis.

15 Claims, 9 Drawing Sheets

(56) References Cited

U.S. PATENT DOCUMENTS

2018/0017065 A1    1/2018   Hall et al.

FOREIGN PATENT DOCUMENTS

| EP | 3043141 A1 | 7/2016 |
|---|---|---|
| KR | 20150132682 A | 11/2015 |

OTHER PUBLICATIONS

European search report dated Aug. 18, 2023, issued in EP Patent Application No. 23160860.5.
Great Britain Search Report dated Sep. 21, 2022, issued in GB Patent Application No. 2204670.0.

* cited by examiner

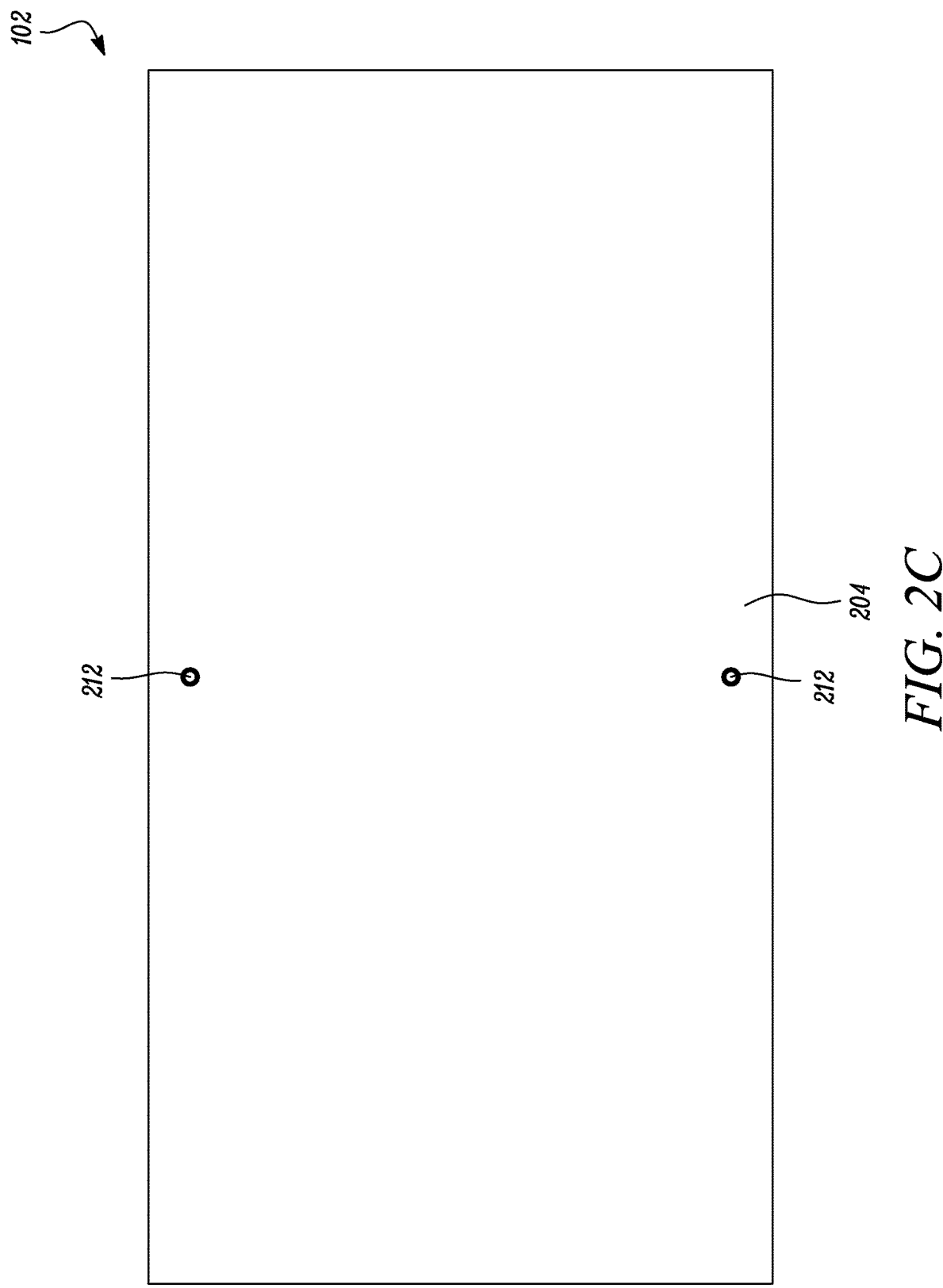

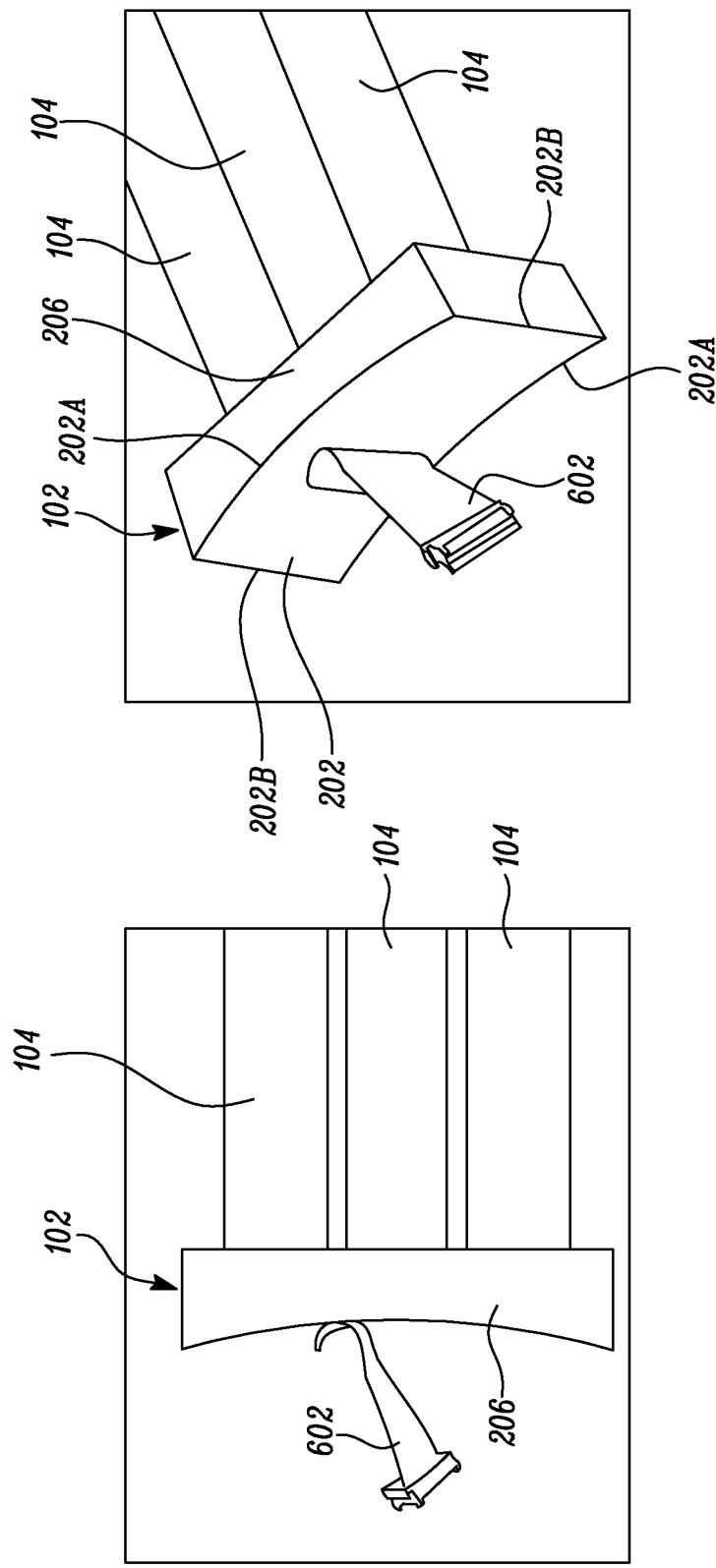

SYSTEM AND METHOD FOR TESTING A SPECIMEN

CROSS-REFERENCE TO RELATED APPLICATIONS

This specification is based upon and claims the benefit of priority from United Kingdom patent application number GB 2204670.0 filed on Mar. 31, 2022, the entire contents of which is incorporated herein by reference.

BACKGROUND

Technical Field

The present disclosure is related to a system and a method for testing a specimen.

Description of the Related Art

Gas turbine engines typically include multiple rows of blades. Each row of blades is surrounded by a casing. There is a possibility of a blade being released and suffering an impact with the casing. Such an impact event is generally referred to as a blade release or containment event.

To simulate such impact events using numerical techniques, such as Finite Element method, an accurate definition of a material of the blade is required. Typical practice is to generate material test data using small specimens over a range of stress states (e.g., tension, compression and shear), strain rates and temperatures relevant to the application.

The material model, which is built using the specimen data, may be then validated using a component test. In case of blade containment scenarios, this is generally done using a blade crush test. In a conventional test setup, a missile impacts a tip of a blade, and loads are transmitted through a root of the blade into a Hopkinson bar tube, through an endcap. The conventional test setup may result in symmetric loading of the blade.

However, the conventional test setup has various limitations. For example, the blade deformation may not be the same as a blade containment event. Further, the endcap may be of too low stiffness to transmit accurate loads into the Hopkinson bar. For long slender blades, the deformation/buckling characteristics caused by the conventional symmetric loading method may be overly sensitive to initial conditions leading to chaotic results. Therefore, in case of the conventional test setup, the load signature and blade crush behaviour are generally quite different from the containment event.

SUMMARY

In one aspect, a system for testing a specimen is provided. The system includes an endcap, a plurality of bars, a plurality of strain gauges, and a gas gun. The endcap includes a first surface and a second surface opposite to the first surface. The first surface is curved. Each bar is disposed in contact with the second surface of the endcap and extends along a longitudinal axis. Each strain gauge is disposed on a surface of a corresponding bar from the plurality of bars. At least one strain gauge is disposed on the surface of each bar. The gas gun is configured to fire a specimen towards the first surface of the endcap such that the specimen impacts the first surface at an oblique angle relative to the longitudinal axis.

Interaction with the endcap may cause the specimen (e.g., a compressor blade) to be loaded asymmetrically. The system may be able to accurately simulate a blade release or containment event. Specifically, the system may apply loading which is similar to a blade release or containment event. The asymmetric loading may produce results which are less sensitive to initial conditions (i.e., less chaotic).

In some embodiments, the first surface of the endcap is concave. In some embodiments, the second surface of the endcap is planar.

In some embodiments, the gas gun is further configured to fire the specimen towards the first surface of the endcap such that the specimen tangentially impacts the first surface. Firing the specimen tangentially towards the endcap may further improve the accuracy of the loading of the specimen.

In some embodiments, each bar is attached to the endcap.

In some embodiments, the system further includes a plurality of supporting members. Each supporting member supports a corresponding bar from the plurality of bars. At least one supporting member supports each bar along its length. In some embodiments, each supporting member is a support cable disposed at least partly around a circumference of the corresponding bar. A length of each support cable may be adjustable to ensure a correct orientation of each bar during testing.

In some other embodiments, each supporting member may include a cylindrical bushing for supporting the corresponding bar.

In some embodiments, the system further includes a bump-stop device spaced apart from an end of each bar opposite to the endcap. The bump-stop device may prevent the bars from being subject to a gross displacement under loading to avoid unnecessary damage to the strain gauges and the bars.

In some embodiments, the system further includes at least one camera for measuring one or more parameters. The one or more parameters includes at least one of: a speed of the specimen prior to impact with the first surface of the endcap; an orientation of the specimen prior to impact with the first surface of the endcap; a location of impact of the specimen; and a fracture of the specimen during impact. The one or more parameters may be used for validating a material model of the specimen.

In some embodiments, the material of the endcap includes at least one of titanium, aluminium and steel.

In some embodiments, the material of each bar includes at least one of titanium, aluminium and steel.

In another aspect, a method for testing a specimen is provided. The method includes providing an endcap having a first surface and a second surface opposite to the first surface. The first surface is curved. The method further includes providing a plurality of bars disposed in contact with the second surface of the endcap and extending along a longitudinal axis. The method further includes providing at least one strain gauge on a surface of each bar. The method further includes firing a specimen towards the first surface of the endcap such that the specimen impacts the first surface at an oblique angle relative to the longitudinal axis. The method further includes measuring one or more loads transmitted to each bar by the endcap using the at least one strain gauge.

Unlike conventional methods which generally causes symmetric loading, the method of the present disclosure may cause the specimen (e.g., a compressor blade) to be loaded asymmetrically due to the interaction with the endcap. The method may be able to accurately simulate a blade release or containment event. Specifically, the method may result in loading which is similar to a blade release or containment event. The asymmetric loading may produce results which are less sensitive to initial conditions (i.e., less chaotic).

In some embodiments, the specimen is fired towards the first surface of the endcap such that the specimen tangentially impacts the first surface.

In some embodiments, the method further includes measuring one or more parameters using at least one camera. The one or more parameters include at least one of: a speed of the specimen prior to impact with the first surface of the endcap, an orientation of the specimen prior to impact with the first surface of the endcap, a location of impact of the specimen; and a fracture of blade during impact.

In some embodiments, the method further includes supporting each bar along its length by at least one supporting member.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIGS. 2A-2D are different views of an endcap of the system of FIG. 1;

FIGS. 5A-5B are different views of the specimen during impact with the endcap.

DETAILED DESCRIPTION

Figure 1:
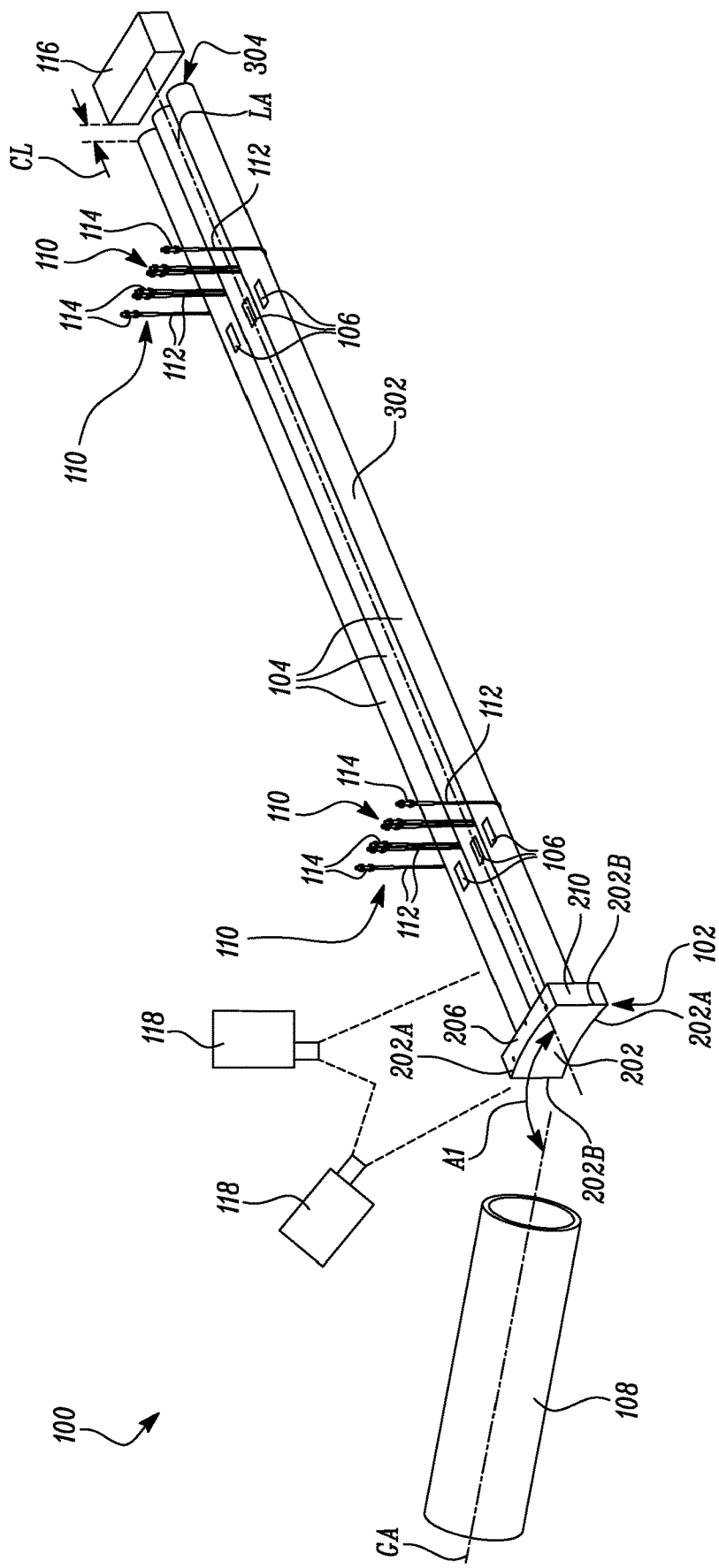
FIG. 1 is a schematic perspective view of an exemplary system for testing a specimen.

With reference to FIG. 1, a system 100 for testing a specimen is provided, in accordance with an embodiment of the present disclosure. The system 100 includes an endcap 102, a plurality of bars 104, a plurality of strain gauges 106 and a gas gun 108. The specimen can be a blade of a gas turbine engine. For example, the specimen can be a compressor blade, a turbine blade, a fan blade, a part of a blade, or a foreign body.

Figure 2A:
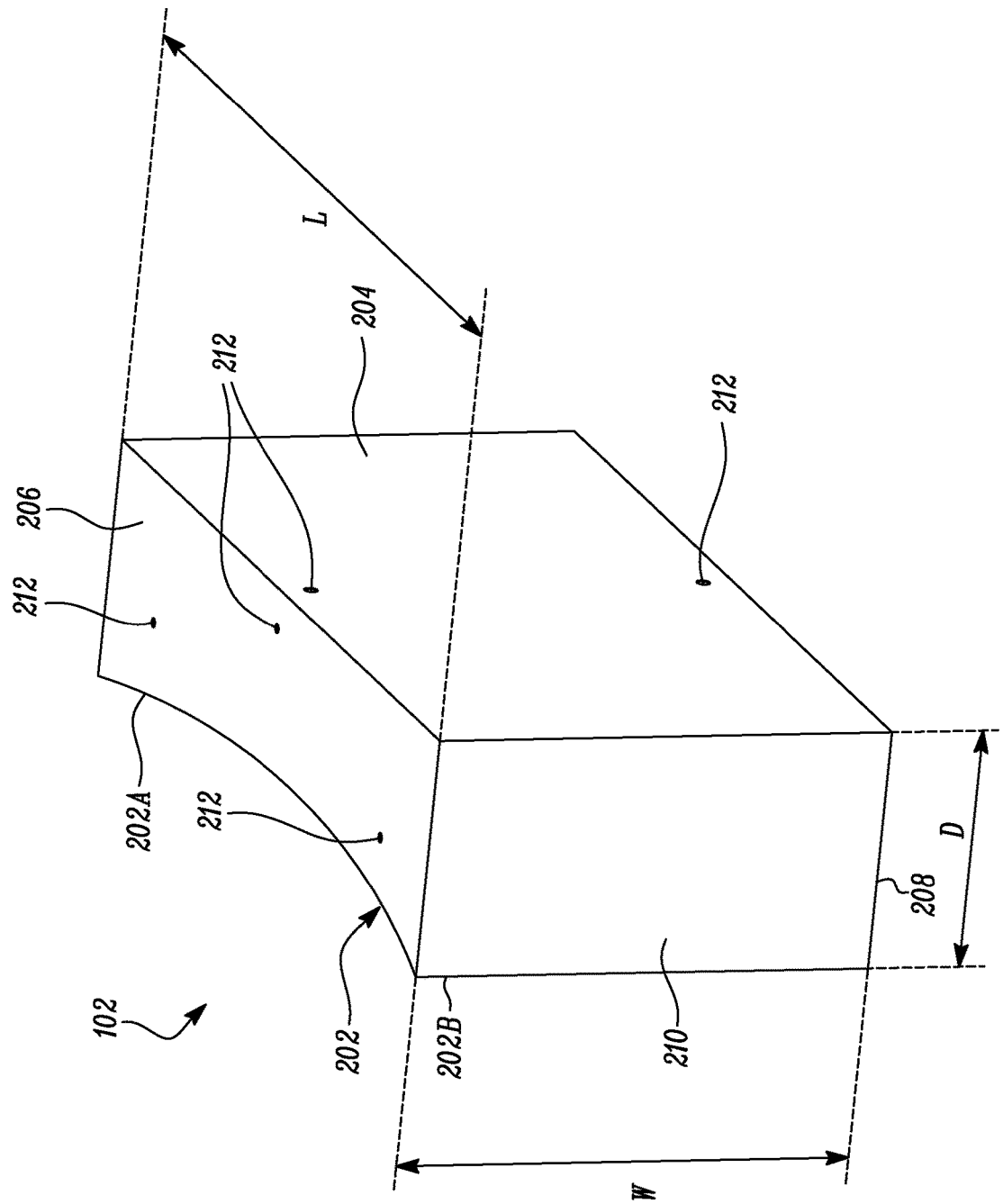
Figure 2B:
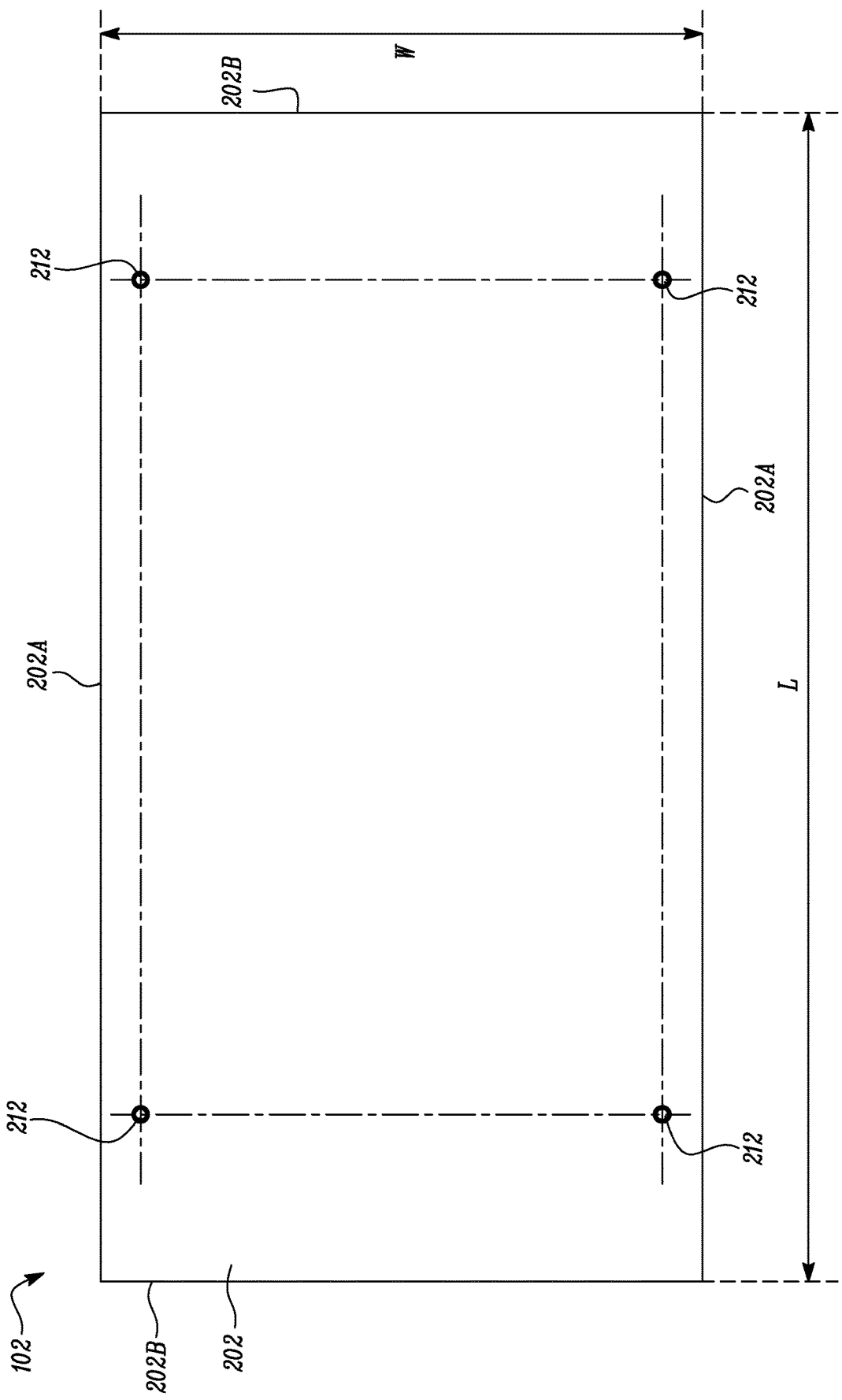
Figure 2D:
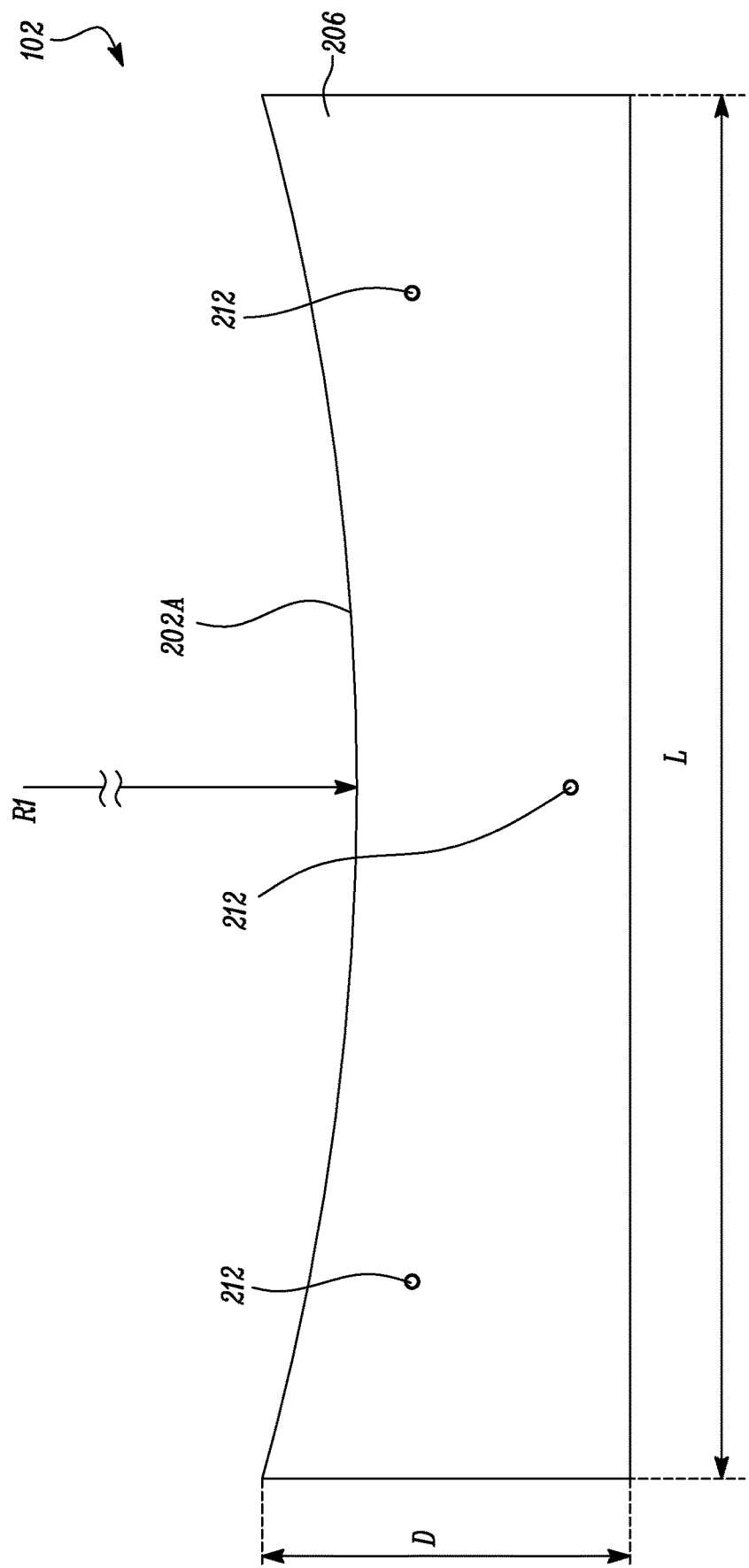

The endcap 102 includes a first surface 202 and a second surface 204 (shown in FIG. 2A) opposite to the first surface 202. The first surface 202 is curved. Each bar 104 is disposed in contact with the second surface 204 of the endcap 102 and extends along a longitudinal axis "LA". In some embodiments, each bar 104 is attached to the endcap 102. Each bar 104 may be attached to the endcap 102 by any suitable method, for example, fasteners, adhesives, welding, brazing, mechanical joints, or any combination thereof. In some embodiments, the bars 104 may be fused with the endcap 102.

Each strain gauge 106 is disposed on a surface 302 of a corresponding bar 104 from the plurality of bars 104. At least one strain gauge 106 is disposed on the surface 302 of each bar 104. In the illustrated embodiment of FIG. 1, two strain gauges 106 are disposed on the surface 302 of each bar 104. Each strain gauge 106 is used to measure strain at a specific location of the corresponding bar 104. In some embodiments, each strain gauge 106 may be a resistive strain gauge including an insulating flexible backing which supports a metallic foil pattern. Each strain gauge 106 may be attached to the corresponding bar 104 by any suitable method, for example, an adhesive such as cyanoacrylate. Terminals of each strain gauge 106 may be electrically connected to a Wheatstone bridge (not shown) to measure strain. Different parameters of each strain gauge 106, such as shape, material, dimensions, attachment location, attachment method etc., may vary based on application requirements.

The gas gun 108 is configured to fire a specimen (not shown in FIG. 1) towards the first surface 202 of the endcap 102 such that the specimen impacts the first surface 202 at an oblique angle relative to the longitudinal axis "LA". In the illustrated embodiment, the gas gun 108 is inclined obliquely relative to the longitudinal axis "LA". The gas gun 108 defines a gun axis "GA" along its length. The gun axis "GA" is inclined obliquely relative to the longitudinal axis "LA". An angle "A1" between the gun axis "GA" and the longitudinal axis "LA" may be substantially equal to the oblique angle at which the specimen impacts the first surface 202 of the endcap 102. In some embodiments, the angle "A1" can be from about 110 degrees to about 130 degrees. In some embodiments, the gas gun 108 is further configured to fire the specimen towards the first surface 202 of the endcap 102 such that the specimen tangentially impacts the first surface 202.

As shown in FIG. 1, the gas gun 108 has a substantially hollow tubular shape. However, the present disclosure is not limited by any shape of the gas gun 108. In some embodiments, the gas gun 108 is a projectile-firing gun which is pneumatically powered by compressed air or any other gas. The air or gas can be pressurized mechanically.

The system 100 further includes a plurality of supporting members 110. Each supporting member 110 supports a corresponding bar 104 from the plurality of bars 104. At least one supporting member 110 supports each bar 104 along its length. In the illustrated embodiment of FIG. 1, each supporting member 110 is a support cable 112 disposed at least partly around a circumference of the corresponding bar 104. In some embodiments, each support cable 112 is a braided twisted steel cable. Each support cable 112 may form a U-shaped configuration in order to support the corresponding bar 104. In the illustrated embodiment, two support cables 112 are provided for each bar 104. However, a number of support cables 112 for supporting each bar 104 may vary based on various factors, such as dimensions of each bar 104, expected loads during testing, etc. Each supporting member 110 further includes end supports 114 disposed at free ends of each support cable 112. Each supporting member 110 may therefore include two end supports 114. Each support cable 112 may be connected to a structure (not shown) by the corresponding end supports 114. A cable length of each support cable 112 can be adjustable to ensure a correct orientation of each bar 104 during a test. In some other embodiments, the bars 104 may be alternatively or additionally supported using other methods, such as plain bearings or roller bearings.

The system 100 further includes a bump-stop device 116 spaced apart from an end 304 of each bar 104 opposite to the endcap 102. The end 304 may be a free end of each bar 104. The end 304 of each bar 104 may not be constrained. The bump-stop device 116 may be retained or secured at a distance from the end 304 of each bar 104. The bump-stop device 116 may prevent the bars 104 from being subject to a gross displacement under loading to avoid unnecessary damage to the bars 104 and the strain gauges 106. A clearance "CL" between the bump-stop device 116 and the end 304 of each bar 104 may be varied as per application requirements. The bump-stop device 116 is embodied as a cuboidal member in FIG. 1. However, a shape and dimensions of the bump-stop device 116 may vary based on the application. The bump-stop device 116 may be made of any suitable material, such as metal or metal alloy, plastic, elastomer or composite. The bump-stop device 116 may be an optional component, and testing may be carried out without the bump-stop device 116.

The system 100 further includes at least one camera 118 for measuring one or more parameters. In the illustrated embodiment of FIG. 1, the system 100 includes two cameras 118 disposed at different orientations and locations. However, a number, locations and orientations of the cameras 118 can be chosen based on the testing and measurement requirements. Each camera 118 may be any optical device that can capture still images and/or moving images. Each camera 118 may be a digital camera or a film camera. In some embodiments, each camera 118 may be a high-speed camera for measuring one or more parameters related to the impact of the specimen with the endcap 102. In some embodiments, the one or more parameters include at least one of: speed of the specimen prior to impact with the first surface 202 of the endcap 102; an orientation of the specimen prior to impact with the first surface 202 of the endcap 102; a location of impact of the specimen; and a fracture the specimen during impact.

In some cases, the speed of the specimen prior to impact can be about 450 metres/second (m/s). Further, a crush load transmitted from the specimen to the endcap 102 due to impact can be less than or equal to about 300 kilonewtons (KN). In some embodiments, testing may be conducted in a vacuum chamber. The vacuum chamber may include portholes for viewing and/or recording the tests.

FIGS. 2A-2D illustrate various views of the endcap 102. Referring to FIGS. 2A-2D, the endcap 102 includes the first surface 202, the second surface 204 opposite to the first surface 202, a top surface 206, a bottom surface 208 opposite to the top surface 206 and a pair of side surfaces 210. The first and second surfaces 202, 204 may be longitudinal surfaces of the endcap 102. The first and second surfaces 202, 204 may extend substantially perpendicular to the longitudinal axis "LA" (shown in FIG. 1) of the bars 104. The first surface 202 is curved. The first surface 202 is further bounded by a pair of longitudinal edges 202A and a pair of lateral edges 202B. A length of each longitudinal edge 202A is greater than a length of each lateral edge 202B. Further, the first surface 202 of the endcap 102 is concave. In some embodiments, the first surface 202 of the endcap 102 may have a partial cylindrical shape. In some embodiments, a radius of curvature "R1" of the first surface 202 is from about 500 millimetres (mm) to about 700 mm. In some embodiments, the radius of curvature "R1" is about 650 mm. In some embodiments, the second surface 204 is planar. Further, each of the top surface 206, the bottom surface 208 and the side surfaces 210 is also planar.

The endcap 102 further has a length "L", a width "W" and a depth "D". The length "L" may be from about 250 mm to about 400 mm. The width "W" may be from about 100 mm to about 200 mm. The depth "D" may be from about 50 mm to about 100 mm. In an example, the length "L" may be about 350 mm, the width "W" may be about 180 mm, and the depth "D" may be about 80 mm. A size of the endcap 102 may be changed based on various factors, such as duration of a crush event during testing and the size of the specimen.

The endcap 102 further defines a plurality of holes 212. In some embodiments, each hole 212 may be a blind hole. Each hole 212 may be drilled or bored into the endcap 102. The holes 212 may be used to receive mechanical fasteners. One or more holes 212 may also be partially threaded. The first surface 202 may include four holes 212. Two holes 212 may be proximal to the top surface 206, while the other two holes 212 may be proximal to the bottom surface 208. The second surface 204 may include two holes 212. One of the holes 212 may be proximal to the top surface 206, while the other hole 212 may be proximal to the bottom surface 208. Each of the top and bottom surfaces 206, 208 may include three holes 212. Some of the holes 212 may communicate with each other. Each hole 212 may be substantially circular. A diameter of each hole 212 may be from about 2 mm to about 5 mm. In an example, the diameter of each hole 212 may be about 3 mm.

The endcap 102 may be made of any suitable material, such as metal or metal alloy, plastic, elastomer or composite. In some embodiments, the endcap 102 is made of at least one of titanium, aluminium and steel.

The endcap 102 can transmit loads from the impact to the bars 104 without any failure, substantial vibrations or loss of contact with the bars 104. The endcap 102 may be designed to be stiff enough so that modal frequencies of the endcap 102 are above an impact frequency. The endcap 102 may be lightly supported to ensure contact with the bars 104.

Figures 3A, 3B:
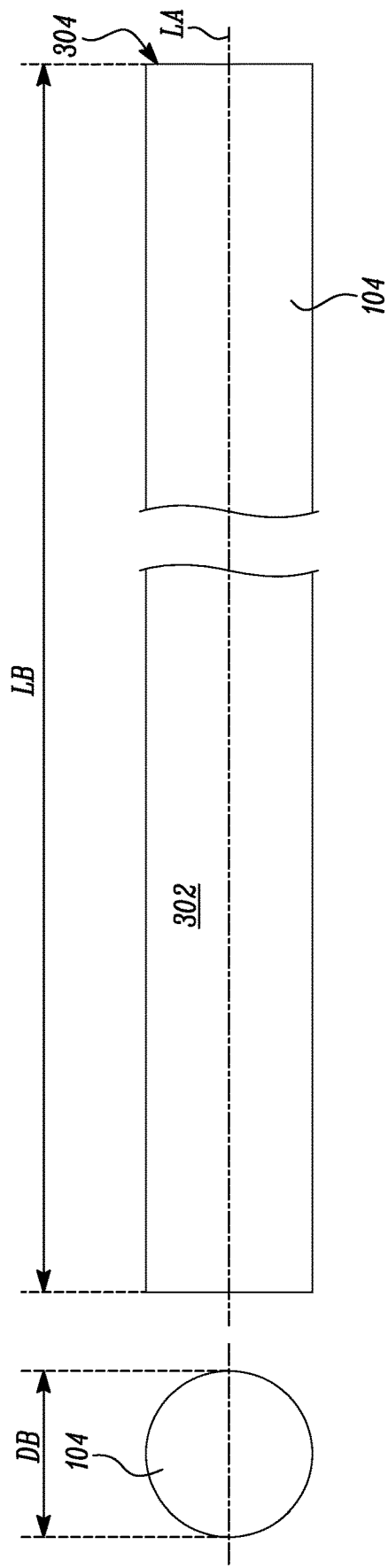
FIGS. 3A-3B are different views of a bar of the system of FIG. 1.

FIGS. 3A-3B illustrate various views of the bar 104. The bar 104 may be a Hopkinson bar. Further, the bar 104 may be a solid cylindrical bar. A length "LB" of the bar 104 may be from about 3000 mm to about 4000 mm. A diameter "DB" of the bar 104 may be from about 50 mm to about 100 mm. In an example, the length "LB" of the bar 104 is about 3500 mm and the diameter "DB" of the bar 104 may be about 85 mm. A size of the bar 104 may be changed based on various factors, such as duration of a crush event during testing and the size of the specimen.

The bar 104 may include one or more chamfered or rounded regions for contact with the endcap 102 and/or attachment with the strain gauges 106 (shown in FIG. 1). The bar 104 may be made of any suitable material, such as metal or metal alloy, plastic, elastomer or composite. In some embodiments, the bar 104 is made of at least one of titanium, aluminium and steel.

An exemplary crush test will be described with reference to FIGS. 4A, 4B, 5A and 5B using the system 100 described above.

Figure 4B:
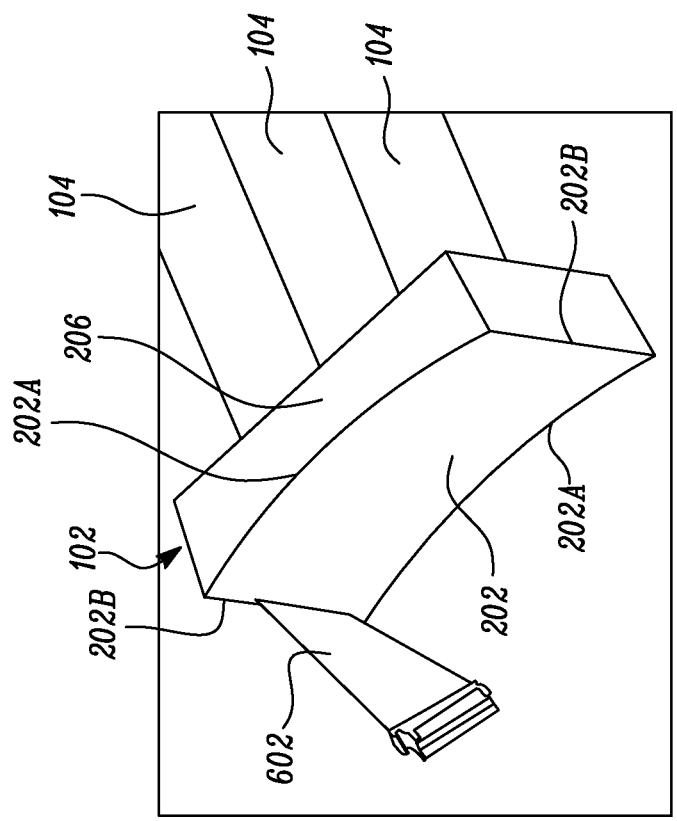
FIGS. 4A-4B are different views of a specimen before impact with an endcap.
Figure 4A:
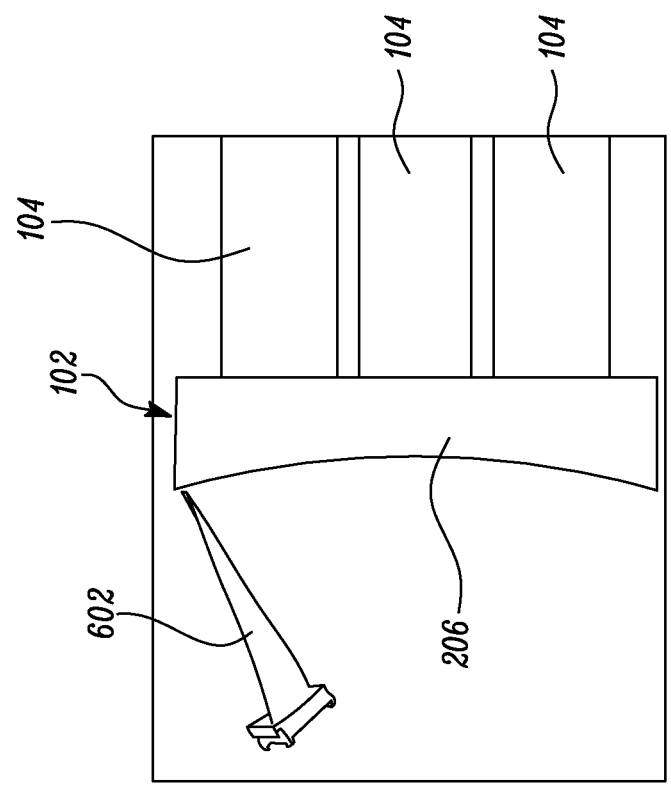

FIGS. 4A and 4B illustrate a specimen 602 prior to an impact with the endcap 102. As shown in FIGS. 4A and 4B, the specimen 602 is a blade of a gas turbine blade. In an example, the specimen 602 is a compressor blade. The specimen 602 is fired from the gas gun 108 towards the first surface 202 of the endcap 102. The specimen 602 may be about to impact one of the lateral edges 202B of the endcap 102. A tip of the specimen 602 may be located proximal to the lateral edge 202B of the endcap 102.

FIGS. 5A and 5B illustrate the specimen 602 during impact with the first surface 202 of the endcap 102. The tip of the specimen 602 may impact the first surface 202. During impact, the specimen 602 may undergo deformation.

The load signature of the crush test can be measured using the strain gauges 106 (shown in FIG. 1) disposed on the bars 104.

The system 100 can be used to simulate a blade crush event behaviour when a blade containment event or release occurs. In case of compressor blades, the system 100 can accurately simulate compressor blade crush behaviour when a compressor containment event happens.

The oblique orientation of the gas gun 108 relative to the longitudinal axis "LA" and the curved shape of the first surface 202 of the endcap 102 may ensure that the specimen 602 (i.e., blade) can arrive at the endcap 102 obliquely. In some cases, the specimen 602 can arrive tangentially at the endcap 102. Interaction with the endcap 102 may cause the specimen 602 to be loaded asymmetrically. Loads are transmitted through the endcap 102 into the bars 104. The strain gauges 106 on the surfaces 302 of the bars 104 can be used to measure the load signature of the crush event. High-speed photography using the cameras 118 can be used to measure the deformation history of the specimen 602.

The system 100 can be used to measure blade collapse load in an accurate manner. Further, the system 100 may crush a compressor blade in a manner similar to a compressor blade release event. Moreover, the system 100 may allow measurement of the dynamic deflections of the blade, including any locations and time of fracture. The bars 104 may also allow accurate measurement of the crush load. The load signature and the blade crush behaviour obtained using the system 100 may be close to a blade containment release event.

In some embodiments, a projective velocity range (i.e., velocity of the specimen 602) may be between 200 m/s and 500 m/s. In some embodiments, a projective mass range (i.e., mass of the specimen 602) may be between 0.5 kg and 2 kg. In some embodiments, the number of bars 104 may be from 1 to 5. In some embodiments, the angle "A1" between the gun 108 and the bars 104 may be from 100 degrees to 150 degrees.

Figure 6:
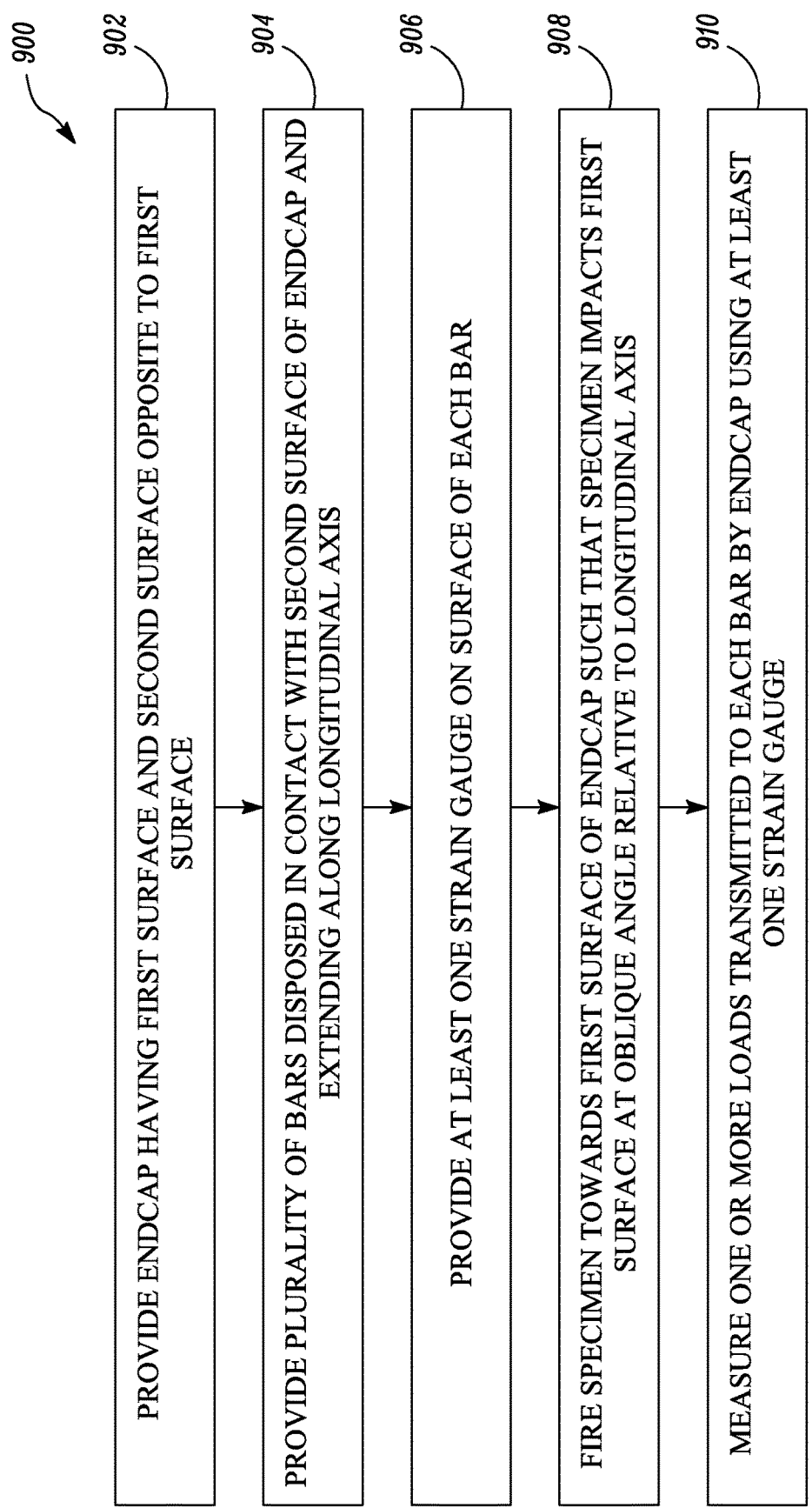
FIG. 6 is a flowchart of an exemplary method for testing a specimen.

FIG. 6 illustrates a method 900 for testing a specimen. The method 900 will be described with reference to the system 100 described above.

At step 902, the method 900 includes providing the endcap 102 having the first surface 202 and the second surface 204 opposite to the first surface 202. The first surface 202 is curved.

At step 904, the method 900 further includes providing the plurality of bars 104 disposed in contact with the second surface 204 of the endcap 102 and extending along the longitudinal axis "LA". In some embodiments, the method 900 further includes supporting each bar 104 along its length by at least one supporting member 110.

At step 906, the method 900 further includes providing at least one strain gauge 106 on the surface 302 of each bar 104.

At step 908, the method 900 further includes firing a specimen towards the first surface 202 of the endcap 102 such that the specimen impacts the first surface 202 at an oblique angle relative to the longitudinal axis "LA". In some embodiments, the specimen is fired towards the first surface 202 of the endcap 102 such that the specimen tangentially impacts the first surface 202.

At step 910, the method 900 further includes measuring one or more loads transmitted to each bar 104 by the endcap 102 using the at least one strain gauge 106.

In some embodiments, the method 900 further includes measuring one or more parameters using at least one camera 118. In some embodiments, the one or more parameters include at least one of: speed of the specimen prior to impact with the first surface 202 of the endcap 102; an orientation of the specimen prior to impact with the first surface 202 of the endcap 102; a location of impact of the specimen; and a fracture the specimen during impact.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A system for testing a specimen, the system comprising:
    an endcap having a first surface and a second surface opposite to the first surface, wherein the first surface is curved;
    a plurality of bars, wherein each bar is disposed in contact with the second surface of the endcap and extends along a longitudinal axis;
    a plurality of strain gauges, wherein each strain gauge is disposed on a surface of a corresponding bar from the plurality of bars, wherein at least one strain gauge is disposed on the surface of each bar; and
    a gas gun configured to fire a specimen towards the first surface of the endcap such that the specimen impacts the first surface at an oblique angle relative to the longitudinal axis.

2. The system of claim 1, wherein the first surface of the endcap is concave.

3. The system of claim 1, wherein the second surface of the endcap is planar.

4. The system of claim 1, wherein the gas gun is further configured to fire the specimen towards the first surface of the endcap such that the specimen tangentially impacts the first surface.

5. The system of claim 1, wherein each bar is attached to the endcap.

6. The system of claim 1, further comprising a plurality of supporting members, wherein each supporting member supports a corresponding bar from the plurality of bars, wherein at least one supporting member supports each bar along its length.

7. The system of claim 6, wherein each supporting member is a support cable disposed at least partly around a circumference of the corresponding bar.

8. The system of claim 1, further comprising a bump-stop device spaced apart from an end of each bar opposite to the endcap.

9. The system of claim 1, further comprising at least one camera for measuring one or more parameters, the one or more parameters comprising at least one of:
    a speed of the specimen prior to impact with the first surface of the endcap;
    an orientation of the specimen prior to impact with the first surface of the endcap;
    a location of impact of the specimen; and
    a fracture of the specimen during impact.

10. The system of claim 1, wherein a material of the endcap comprises at least one of titanium, aluminium and steel.

11. The system of claim 1, wherein a material of each bar comprises at least one of titanium, aluminium and steel.

12. A method for testing a specimen, the method comprising the steps of:
    providing an endcap having a first surface and a second surface opposite to the first surface, wherein the first surface is curved;

providing a plurality of bars disposed in contact with the second surface of the endcap and extending along a longitudinal axis;

providing at least one strain gauge on a surface of each bar;

firing a specimen towards the first surface of the endcap such that the specimen impacts the first surface at an oblique angle relative to the longitudinal axis; and measuring one or more loads transmitted to each bar by the endcap using the at least one strain gauge.

13. The method of claim 12, wherein the specimen is fired towards the first surface of the endcap such that the specimen tangentially impacts the first surface.

14. The method of claim 12, further comprising measuring one or more parameters using at least one camera, the one or more parameters comprising at least one of:

a speed of the specimen prior to impact with the first surface of the endcap;

an orientation of the specimen prior to impact with the first surface of the endcap;

a location of impact of the specimen; and a fracture of the specimen during impact.

15. The method of claim 12, further comprising supporting each bar along its length by at least one supporting member.

* * * * *